(12) United States Patent
Fukuda

(10) Patent No.: US 6,278,569 B1
(45) Date of Patent: Aug. 21, 2001

(54) SIGNAL RECORDING APPARATUS AND METHOD

(75) Inventor: Shinichi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,571

(22) Filed: Jun. 7, 1999

(30) Foreign Application Priority Data

Jun. 9, 1998 (JP) .................................................. 10-161086

(51) Int. Cl.⁷ .............................. G11B 15/14; G11B 5/00
(52) U.S. Cl. ................................................... 360/64; 360/8
(58) Field of Search .................................... 360/64, 61, 8

(56) References Cited

U.S. PATENT DOCUMENTS 5,276,566 * 1/1994 Clifford, Jr. .............................. 360/64
6,091,561 * 7/2000 Hamaguchi .............................. 360/64

* cited by examiner

Primary Examiner—Regina Neal
(74) Attorney, Agent, or Firm—Jay H. Maioli

(57) ABSTRACT

A signal recording apparatus and method supplies recording signals to at least a pair of positive and negative azimuth magnetic heads provided on a rotary drum so as to be adjacent to each other in all recording occasions for recording by the magnetic heads when a recording track having a first track width is formed on the magnetic tape, while the apparatus and method supplies recording signals to at least the pair of positive and negative azimuth magnetic heads once in a predetermined number of recording occasions for recording by the recording heads when a recording track having a second track width which is larger than the first track width is formed on the magnetic tape.

3 Claims, 4 Drawing Sheets

SIGNAL RECORDING APPARATUS AND METHOD

BACKGROUND OF THE INVENTION

1. Field of the Invention

The present invention relates to helical-scanning signal recording apparatuses and methods that form tracks inclined with respect to a magnetic tape, and in particular, to a signal recording apparatus and method for recording signals on a magnetic tape by using a plurality of recording modes for different recording densities.

2. Description of the Related Art

A conventional helical-scanning recording apparatus is known in which a magnetic tape as a recording medium is run wound around a rotary drum, and recording tracks inclined with respect to the travelling direction of the magnetic tape are formed using magnetic heads mounted on the rotary drum so that audio signals, video signals, etc., are recorded.

The helical-scanning recording apparatus includes, in general, at least a pair of recording magnetic heads having different azimuths (hereinafter referred to as a "positive azimuth recording magnetic head" and a "negative azimuth recording magnetic head"). The helical-scanning recording apparatus alternately forms positive azimuth recording tracks and negative azimuth recording tracks on the magnetic tape at a predetermined track pitch by alternately using the positive and negative azimuth recording magnetic heads to perform recording.

In addition, recently, a recording apparatus has been proposed that detects errors by performing a playback of signals recorded by a recording magnetic head, and records the same signals again when having detected an error in the recorded signals so that the reliability of the recorded signals is enhanced.

In this type of recording apparatus, the positive azimuth recording head and the negative azimuth recording head are fixed on the same head base mounted on a rotary drum so as to be adjacent to each other. The recording apparatus checks reproduction of the recorded signals in a semi-cyclic revolution of the rotary drum in which the positive and negative azimuth recording magnetic heads are not in contact with the magnetic tape.

The recording apparatus can prevent a problem in that a large amount of recording current flows in the reproducing system because the recording apparatus does not simultaneously perform recording and reproduction check. In the recording apparatus, the pair of positive and negative azimuth recording magnetic heads is provided on the rotary drum so that they are adjacent to each other. This arrangement prevents a recording position shift in units of revolutions of the rotary drum, which causes a problem in a case where the pair of positive and negative azimuth recording magnetic heads are provided so as to be opposed to each other, whereby recording tracks can be formed at an accurate pitch.

In recording apparatuses for recording signals on a magnetic tape, it has recently been studied that a surface recording density is increased by reducing a track pitch for recording tracks formed on the magnetic tape in order to enable a large amount of recording for coping with an increased amount of information to be processed. Also, it is required that the recording apparatuses have so-called "compatibility" in which recording using a small track pitch and recording using a conventional track pitch can be performed.

Among the recording apparatuses, a type of recording apparatus, which has a pair of positive and negative azimuth recording magnetic heads provided on the rotary head so as to be opposed to each other, easily changes a track pitch for recording tracks formed on the magnetic tape by changing the feeding speed of the magnetic tape. Thus, the above-described compatibility between the small track pitch and the conventional track pitch can be easily obtained.

Conversely, in a type of recording apparatus having a pair of positive and negative azimuth recording magnetic heads provided on the rotary head so as to be adjacent to each other, the width of each recording track formed on the magnetic tape is determined by a track-widthwise distance between the positive and negative azimuth recording magnetic heads, that is, a head position difference. Accordingly, in this type of recording apparatus, it is difficult to obtain the above-described compatibility between the small track pitch and the conventional track pitch. This complicates the apparatus structure and the apparatus control in that, for example, a plurality of recording magnetic heads is provided on a rotary drum so that different head position differences are formed, and the recording magnetic heads are selectively used for recording.

SUMMARY OF THE INVENTION

Accordingly, it is an object of the present invention to provide a recording apparatus having a pair of positive and negative azimuth recording magnetic heads provided on a rotary drum so as to be adjacent to each other in which both recording using a small track pitch and recording using a conventional track pitch are performed using simplified means, and a signal recording method that uses the recording apparatus to record signals.

To this end, according to an aspect of the present invention, the foregoing object is achieved through provision of a helical-scanning recording apparatus for performing recording track formation at predetermined pitches on a magnetic tape, which includes at least a pair of positive and negative azimuth magnetic heads provided on a rotary drum so as to be adjacent to each other, and a signal supplier for supplying recording signals to the pair of positive and negative azimuth magnetic heads. In the recording apparatus, when a recording track having a first track width is formed on the magnetic tape, the signal supplier supplies the recording signals to the pair of positive and negative azimuth magnetic heads on all recording occasions for recording by the magnetic heads. When a recording track having a second track width which is (2n+1) times larger than the first track width where n represents a natural number is formed on the magnetic tape where n represents a natural number, the signal supplier supplies the recording signals to either one of the pair of positive and negative azimuth magnetic heads once in (2n+1) recording occasions for recording by the magnetic heads.

Preferably, two pairs of positive and negative azimuth magnetic heads are used in place of the pair of positive and negative azimuth magnetic heads.

According to another aspect to the present invention, the foregoing object is achieved through provision of a helical-scanning signal recording method for performing recording track formation at predetermined pitches on a magnetic tape, which includes the steps of supplying recording signals to a pair of positive and negative azimuth magnetic heads provided on a rotary drum so as to be adjacent to each other in all recording occasions for recording by the magnetic heads when a recording track having a first track width is formed on the magnetic tape, and supplying recording signals to either of the pair of positive and negative azimuth magnetic heads once in (2n+1) recording occasions (where n represents a natural number) for recording by the recording heads when a recording track having a second track width which is (2n+1) times larger than the first track width is formed on the magnetic tape.

According to the present invention, both recording using a small track pitch and recording using a conventional track pitch can be performed without providing a separate recording magnetic head in accordance with the width of a recording track to be formed and without performing complicated control such as control of the number of revolutions of a rotary drum and the feeding speed of a magnetic tape in accordance with the width of a recording track to be formed.

DESCRIPTION OF THE PREFERRED EMBODIMENTS

The present invention is described below with reference to the attached drawings.

Figure 1:
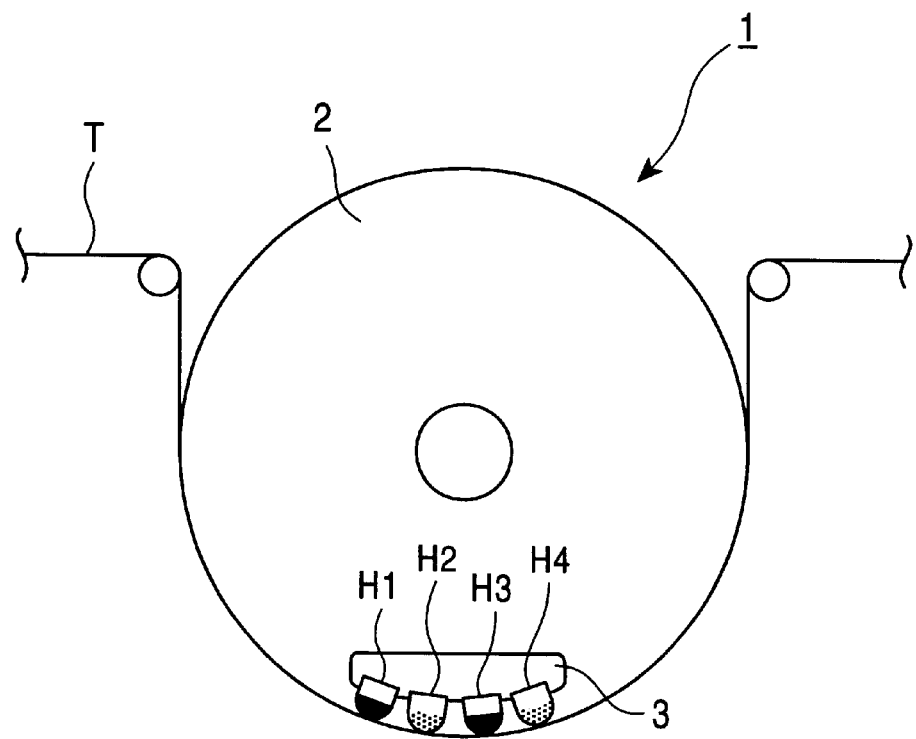
FIG. 1 is a cross-sectional view showing a rotary head in a recording apparatus according to an embodiment of the present invention.

A recording apparatus according to an embodiment of the present invention includes a rotary head unit 1 as shown in FIG. 1. In the recording apparatus, a magnetic tape T is run with it wound around the rotary head unit 1 at a predetermined lap angle, and the rotary head unit 1 is rotated to form recording tracks inclined with respect to the feeding direction of the magnetic tape T so that signals are written. For signal recording, the recording apparatus selects one mode from among a high density recording mode in which recording tracks having a small width are formed for signal recording, and a standard recording mode in which recording tracks having a width broader than the track width in the high density recording mode.

The rotary head unit 1 in the recording apparatus includes a rotary drum 2, and four recording magnetic heads (hereinafter referred to as a "first recording magnetic head H1", a "second recording magnetic head H2", a "third recording magnetic head H3", and a "fourth recording magnetic head H4") mounted on the rotary drum 2 so as to direct their magnetic gaps from the circular surface of the rotary drum 2 toward the magnetic tape T.

Each of the first recording magnetic head H1 and the third recording magnetic head H3 is a positive azimuth recording magnetic head having a magnetic gap inclined by a predetermined angle (azimuth) so as to be perpendicular to a direction in which the first recording magnetic head H1 and the third recording magnetic head H3 move in accordance with the rotation of the rotary drum 2. Each of the second recording magnetic head H2 and the fourth recording magnetic head H4 is a negative azimuth recording magnetic head having a predetermined azimuth so as to be perpendicular to a direction in with the second recording magnetic head H2 and the fourth recording magnetic head H4 move in accordance with the rotation of the rotary drum 2.

A pair of the first and second recording magnetic heads H1 and H2, and a pair of the third and fourth recording magnetic heads H3 and H4 constitute so-called "double azimuth magnetic heads". In other words, the rotary head unit 1 includes two pairs of double azimuth magnetic heads.

Figure 2:
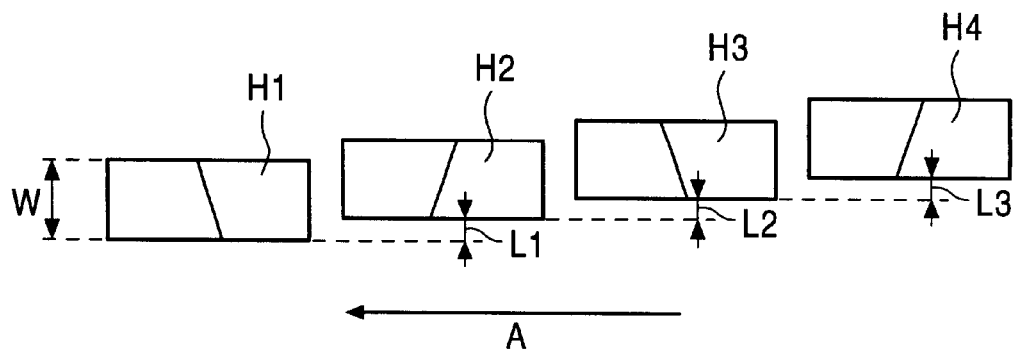
FIG. 2 is an illustration showing head position differences among first to fourth recording magnetic heads.
Figure 3:
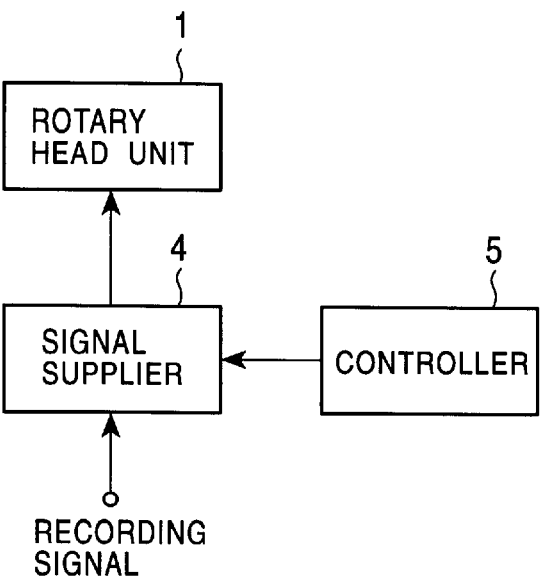
FIG. 3 is a block diagram showing a recording apparatus according to an embodiment of the present invention.

The first to fourth recording magnetic heads H1, H2, H3, and H4 are fixed on a head base 3 mounted on the rotary head 2 so as to be adjacent to one another. The first to fourth recording magnetic heads H1, H2, H3, and H4 are positioned as shown in FIG. 2 so that each of track widthwise distances among the recording magnetic heads H1, H2, H3, and H4, that is, each of head position differences L1, L2, and L3 is approximately a quarter of head width W perpendicular to direction A in which the recording magnetic heads H1, H2, H3, and H4 slide.

In the rotary head unit 1, the rotation of the rotary drum 2 obliquely slides the recording magnetic heads H1, H2, H3, and H4 on the magnetic tape T with respect to its feeding direction, whereby inclined recording tracks are formed on the magnetic tape T.

The recording apparatus also includes a signal supplier 4 for supplying recording signals to the rotary head unit 1, and a controller 5 for controlling the operation of the signal supplier 4. Recording signals to be recorded on the magnetic tape T are input to the signal supplier 4. After performing predetermined signal processing for the recording signals, the signal supplier 4 is controlled by the controller 5 to supply the processed recording signals to the recording magnetic heads H1, H2, H3, and H4 in predetermined timing.

Specifically, when the high density recording mode in which recording tracks having a small width are formed for signal recording is selected, the signal supplier 4 supplies the recording signals to the recording magnetic heads H1, H2, H3, and H4 on all recording occasions in which each of the recording magnetic heads H1, H2, H3, and H4 performs recording, that is, on all occasions in which the recording magnetic heads H1, H2, H3, and H4 slide on the magnetic tape T.

As described above, in the high density recording mode, the recording signals are supplied from the signal supplier 4 to the recording magnetic heads H1, H2, H3, and H4 on all recording occasions. Thus, whenever the recording magnetic heads H1, H2, H3, and H4 slide on the magnetic tape T, recording tracks are formed in accordance with the sliding tracks of the recording magnetic heads H1, H2, H3, and H4.

Figure 4:
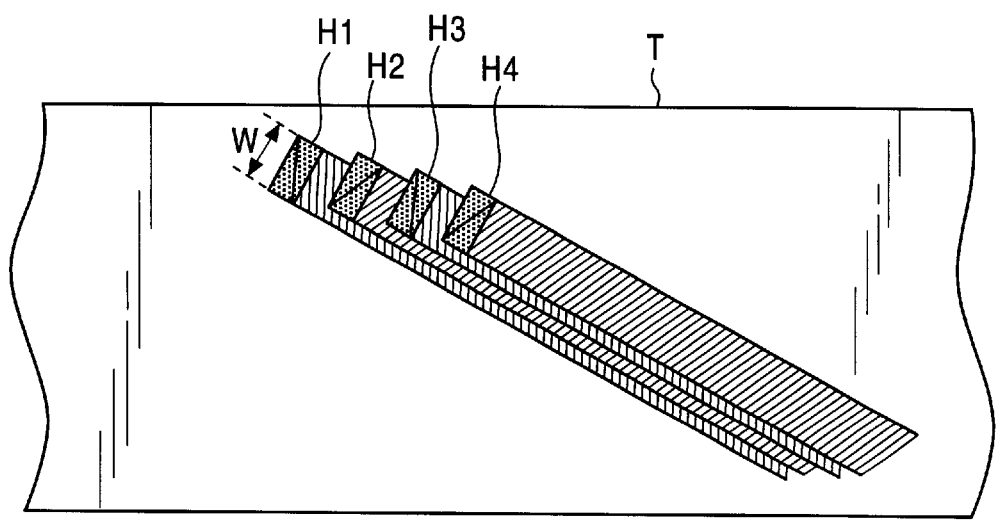
FIG. 4 is a plan view showing the formation of recording tracks in high density recording mode by a recording apparatus according to an embodiment of the present invention.

In other words, recording tracks having a width that is approximately a quarter of head width W are successively formed on the magnetic tape T as shown in FIG. 4 because each of head position differences L1, L2, and L3 among the recording magnetic heads H1, H2, H3, and H4 is set to be approximately a quarter of head width W.

Specifically, on the magnetic tape T, a positive azimuth recording track is initially formed in an area on which the first recording magnetic head H1 slides, and a negative azimuth recording track is formed by the second recording magnetic head H2 in an area that is shifted by approximately a quarter of head width W from the sliding area of the first recording magnetic head H1. At this time, the positive azimuth recording track formed by the first recording magnetic head H1 is overwritten by the negative azimuth recording track formed by the second recording magnetic head H2, excluding a portion having a width corresponding to approximately a quarter of head width W.

The third recording magnetic head H3 forms a positive azimuth recording track in an area that is shifted by approximately a quarter of head width W from the sliding area of the second recording magnetic head H2. The negative azimuth recording track formed by the second recording magnetic head H2 is overwritten by the positive azimuth recording track formed by the third recording magnetic head H3, excluding a portion having a width corresponding to approximately a quarter of head width W.

The fourth recording magnetic head H4 forms a positive azimuth recording track in an area that is shifted by approximately a quarter of head width W from the sliding area of the third recording magnetic head H3. The positive azimuth recording track formed by the third recording magnetic head H3 is overwritten by the negative azimuth recording track formed by the fourth recording magnetic head H4, excluding a portion having a width corresponding to approximately a quarter of head width W.

Figure 5:
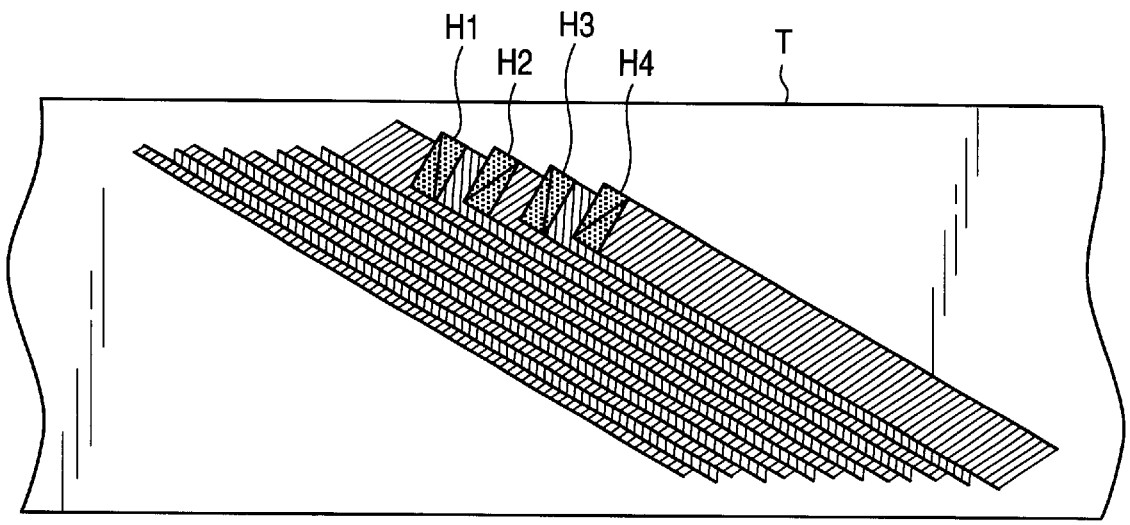
FIG. 5 is a plan view showing recording tracks formed in high density recording mode by a recording apparatus according to an embodiment of the present invention.

According to the present invention, when the high density recording mode is selected, the recording apparatus form a plurality of recording tracks having a width that is approximately a quarter of head width W as shown in FIG. 5 by using the recording magnetic heads H1, H2, H3, and H4 to perform successive recording track formation on all recording occasions.

When the standard recording mode in which recording tracks having a width broader than that in the high density recording mode is selected, the signal supplier 4 supplies recording signals to the recording magnetic heads H1, H2, H3, and H4, for example, once in three recording occasions.

Figure 6:
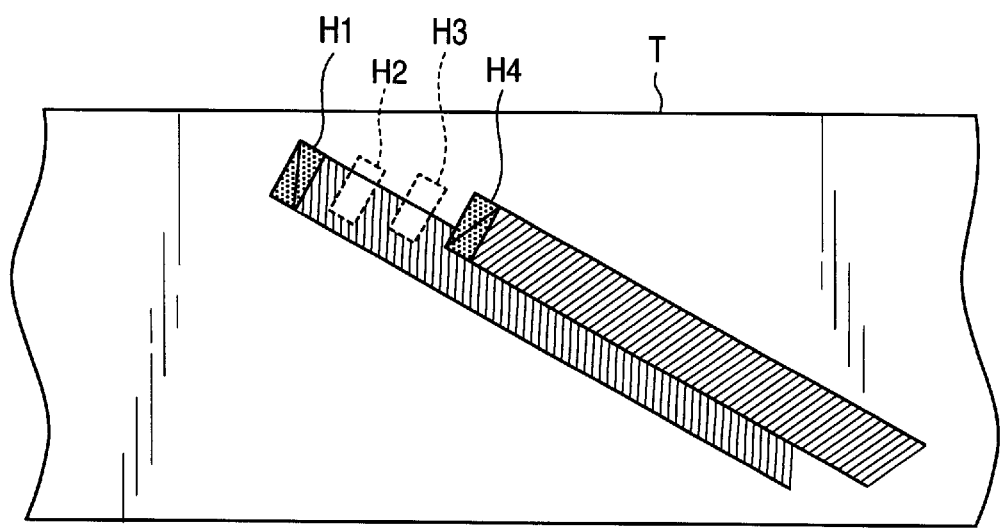
FIG. 6 is a plan view showing the formation of recording tracks in standard recording mode by a recording apparatus according to an embodiment of the present invention.

Specifically, when the standard recording mode is selected, the signal supplier 4 supplies recording signals to only the first and fourth recording magnetic heads H1 and H4 in the first recording occasion in which the recording magnetic heads H1, H2, H3, and H4 slide on the magnetic tape T. This forms, on the magnetic tape T, a positive azimuth recording track corresponding to the sliding path of the first recording magnetic head H1, and a negative azimuth recording track corresponding to the sliding path of the fourth recording magnetic head H4, as shown in FIG. 6.

Because the head position difference between the first and fourth recording magnetic heads H1 and H4 is set to be approximately three quarters of head width W, the positive azimuth recording track formed by the first recording magnetic head H1 is overwritten by the negative azimuth recording track formed by the fourth recording magnetic head H4, excluding a portion having a width corresponding to approximately a quarter of head width W.

Figure 7:
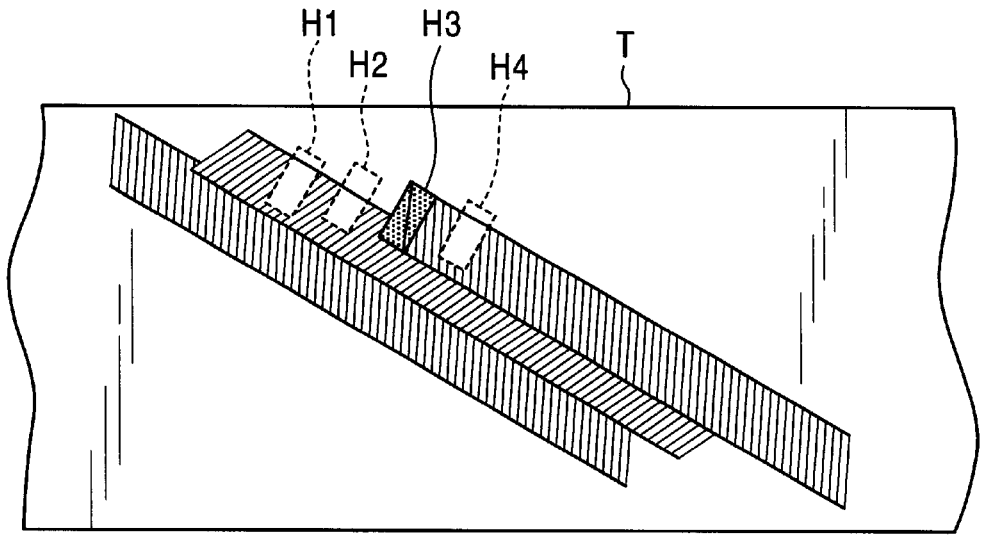
FIG. 7 is a plan view showing the formation of recording tracks in standard recording mode by a recording apparatus according to an embodiment of the present invention.

In the second recording occasion in which the recording magnetic heads H1, H2, H3, and H4 slide on the magnetic tape T, the signal supplier 4 supplies recording signals to only the third recording magnetic head H3. This forms, on the magnetic tape T, a positive azimuth recording track corresponding to the sliding path of the third recording magnetic head H3 as shown in FIG. 7.

At this time, the third recording magnetic head H3 slides on an area that is shifted by approximately three quarters of head width W from the sliding area of the fourth recording magnetic head H4. Thus, the negative azimuth recording track formed by the fourth recording magnetic head H4 in the first recording occasion is overwritten by the positive azimuth recording track formed by the third recording magnetic head H3, excluding a portion having a width corresponding to approximately three quarters of head width W.

Figure 8:
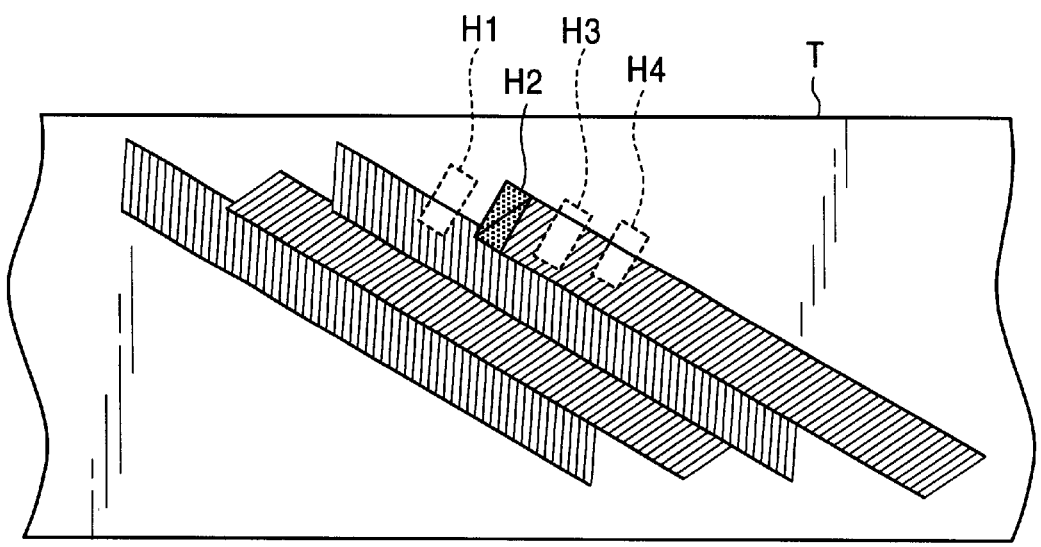
FIG. 8 is a plan view showing the formation of recording tracks in standard recording mode by a recording apparatus according to an embodiment of the present invention.

In the third recording occasion in which the recording magnetic heads H1, H2, H3, and H4 slides on the magnetic tape T, the signal supplier 4 supplies recording signals to only the second recording magnetic head H2. This forms, on the magnetic tape T, a negative azimuth recording track corresponding to the sliding path of the second recording magnetic head H2 as shown in FIG. 8.

At this time, the second recording magnetic head H2 slides an area that is shifted by approximately three quarters of head width W from the sliding area of the third recording magnetic head H3. Thus, the positive azimuth recording track formed by the third recording magnetic head H3 in the second recording occasion is overwritten by the negative azimuth recording track formed by the second recording magnetic head H2, excluding a portion having a width corresponding to approximately three quarters of head width W.

In the recording apparatus of the present invention, when the standard recording mode is selected, the signal supplier 4 supplies recording signals to recording magnetic heads H1, H2, H3, and H4 once in three recording occasions by repeatedly performing the above-described processing. This forms, on the magnetic tape T, a plurality of recording tracks having a width that is approximately three quarters of head width W.

As described above, according to the recording apparatus of the present invention, when the high density recording mode is selected, the signal supplier 4 supplies recording signals to the recording magnetic heads H1, H2, H3, and H4 in all recording occasions, whereby recording tracks having a width that is approximately a quarter of head width W are formed on the magnetic tape T. When the standard recording mode is selected, the signal supplier 4 supplies recording signals to each of the recording magnetic heads H1, H2, H3, and H4 once in three recording occasions, whereby recording tracks having a width that is approximately three quarters of head width W are formed on the magnetic tape T.

Therefore, both recording using a small track pitch and recording using a conventional track pitch can be performed by the recording apparatus of the present invention without providing a separate recording magnetic head in accordance with the width of a recording track to be formed, and performing complicated control such as control of the number of revolutions of the rotary drum 2 and the feeding speed of the magnetic tape T in accordance with the width of a recording track to be formed.

The present invention has been described using an embodiment in which the signal supplier 4 supplies recording signals to each of the recording magnetic heads H1, H2, H3, and H4 once in three recording occasions when the standard recording mode is selected. However, the recording apparatus of the present invention is not limited to the embodiment. For example, the signal supplier 4 may supply recording signals to each of the recording magnetic heads H1, H2, H3, and H4 once in an odd number of recording occasions not less than three.

According to the recording apparatus of the present invention, in the case where the signal supplier 4 supplies recording signals to each of the recording magnetic heads H1, H2, H3, and H4 once in five recording occasions when the standard recording mode is selected, recording tracks having a width five times the recording track width formed in the high density recording mode is selected. In this case, each of the recording magnetic heads H1, H2, H3, and H4 is positioned so that each of head position differences among the recording magnetic heads H1, H2, H3, and H4 is 1/5 of head width W. Recording signal supply by the signal supplier 4 is set up so that recording signals are supplied to only the first recording magnetic head H1 in the first recording occasion, recording signals are supplied to only the second recording magnetic head H2 in the second recording occasion, recording signals are supplied to only the third recording magnetic head in the third recording occasion, recording signals are supplied to only the fourth recording magnetic head in the fourth recording occasion, and recording signals are not supplied to any of the recording magnetic heads H1, H2, H3, and H4 in the fifth recording occasion. This appropriately forms recording tracks having a width five times the recording track width formed in the high density recording mode.

Although the recording apparatus including two pairs of double azimuth recording magnetic heads has been described, the present invention is not limited to such a recording apparatus, but the present invention may be applied to a recording apparatus including a pair of double azimuth recording magnetic heads, or three or more pairs of double azimuth recording magnetic heads.

What is claimed is:

1. A helical-scanning recording apparatus for forming recording tracks at predetermined pitches on a magnetic tape, comprising:

a pair of positive and negative azimuth magnetic heads provided on a rotary drum separated by a predetermined distance that is a fraction of a head width in an axial direction of said rotary drum; and a signal supplier for supplying recording signals to said pair of positive and negative azimuth magnetic heads, wherein in a high density mode, a first recording track having a first track width is formed on said magnetic tape when said signal supplier supplies said recording signals to said pair of positive and negative azimuth magnetic heads on all recording occasions for recording by said magnetic heads thereby causing a subsequent recording track to overlap said first track so that said first track width is equal to said head distance, and in a low density mode a second recording track having a second track width which is larger than said first track width and equal to the head width is formed on said magnetic tape when said signal supplier supplies said recording signals to either one of said pair of positive and negative azimuth magnetic heads once in a predetermined number of recording occasions for recording on said magnetic tape.

2. The recording apparatus according to claim 1, wherein two pairs of positive and negative azimuth magnetic heads are used in place of said pair of positive and negative azimuth magnetic heads.

3. A helical-scanning signal recording method for forming recording tracks at predetermined pitches on a magnetic tape, the method comprising the steps of:

supplying recording signals in a high density mode to a pair of positive and negative azimuth magnetic heads, provided on a rotary drum and separated by a predetermined distance that is a fraction of a head width in an axial direction of said rotary drum on all recording occasions for recording by said pair of magnetic heads when a first recording track having a first track width is formed on said magnetic tape thereby causing a subsequent recording track to overlap said first track so that said first track width is equal to said predetermined distance; and supplying recording signals in a low density mode to either one of said pair of positive and negative azimuth magnetic heads once in a predetermined number of recording occasions for recording by said recording heads when a second recording track having a second track width which is larger than said first track width and equal to the head width is formed on said magnetic tape.

* * * * *